(12) United States Patent
Isaka et al.

(10) Patent No.: US 8,303,817 B2
(45) Date of Patent: Nov. 6, 2012

(54) WASTEWATER TREATMENT METHOD AND WASTEWATER TREATMENT APPARATUS

(75) Inventors: Kazuichi Isaka, Tokyo (JP); Yuya Kimura, Tokyo (JP); Tatsuo Sumino, Tokyo (JP)

(73) Assignee: Hitachi Plant Technologies, Ltd., Tokyo (JP)

( * ) Notice: Subject to any disclaimer, the term of this patent is extended or adjusted under 35 U.S.C. 154(b) by 413 days.

(21) Appl. No.: 12/729,264

(22) Filed: Mar. 23, 2010

(65) Prior Publication Data
US 2010/0243565 A1 Sep. 30, 2010

(30) Foreign Application Priority Data
Mar. 25, 2009 (JP) .................................. 2009-074246

(51) Int. Cl.
*C02F 3/30* (2006.01)
(52) U.S. Cl. ........ 210/605; 210/614; 210/616; 210/630; 210/143; 210/150; 210/903
(58) Field of Classification Search .................. 210/605, 210/614, 616, 630, 143, 150, 151, 252, 259, 210/903
See application file for complete search history.

(56) References Cited

U.S. PATENT DOCUMENTS

| 6,565,751 | B2 * | 5/2003 | Sato et al. ..................... 210/616 |
| 2002/0005381 | A1 * | 1/2002 | Sato et al. ..................... 210/616 |
| 2006/0191846 | A1 * | 8/2006 | Sumino et al. ................. 210/603 |
| 2006/0196815 | A1 * | 9/2006 | Isaka et al. ................... 210/195.1 |

FOREIGN PATENT DOCUMENTS

| JP | 2001-293494 | 10/2001 |
| JP | 2004-230225 | 8/2004 |
| JP | 2004-230259 | 8/2004 |
| WO | WO 2004/101448 A1 * | 11/2004 |

OTHER PUBLICATIONS

K. A. Third et al.; The CANON System (Completely Autotroophic Nitrogen-removal Over Nitrite) under Ammonium Limitation: Interaction and Competiotin between Three Groups of Bacteria; System. Appl. Microbiol. 24, 2001, pp. 588-596.
Furukawa et al., Innovative Treatment System for Digester Liquor Using Anammox Process, Bioresource Technology, vol. 100, 2009, pp. 5437-5443.
Dutch Search Report and Written Opinion with translation dated Nov. 1, 2010.

* cited by examiner

*Primary Examiner* — Fred Prince
(74) *Attorney, Agent, or Firm* — Antonelli, Terry, Stout & Kraus, LLP.

(57) ABSTRACT

A nitrification carrier having made nitrifying bacteria dominant therein and a denitrification carrier having made anaerobic ammonium-oxidizing bacteria dominant therein are mixed in a treatment tank. Both of a nitrification reaction with the nitrification carrier and a denitrification reaction with denitrification carrier are allowed to proceed in the treatment tank to decompose ammonium nitrogen in wastewater to nitrogen gas. The ratio of the bacterial loads of the nitrifying bacteria and the anaerobic ammonium-oxidizing bacteria can be easily controlled by immobilizing the nitrifying bacteria and the anaerobic ammonium-oxidizing bacteria on different carriers from each other (nitrification carrier and denitrification carrier) and by controlling the volume ratio (ratio of the feeding amounts) of the nitrification carrier and the denitrification carrier.

12 Claims, 11 Drawing Sheets

FIG.7

WATER QUALITY OF AMMONIUM WASTEWATER (per 100 L)

| | |
|---|---|
| $(NH_4)_2SO_4$ | 330 g |
| $MgSO_4 \cdot 7H_2O$ | 25 g |
| $CaCl_2 \cdot 2H_2O$ | 7.2 g |
| $NaHCO_3$ | 410 g |
| $Na_2HPO_4 \cdot 2H_2O$ | 35 g |
| NaCl | 15 g |
| KCl | 7.2 g |

FIG.8

| | |
|---|---|
| $(NH_4)_2SO_4$ | 70~430 mg/L as N |
| $NaNO_2$ | 70~570 mg/L as N |
| $MgSO_4 \cdot 7H_2O$ | 30 mg/L |
| $CaCl_2 \cdot 2H_2O$ | 18 mg/L |
| $NaHCO_3$ | 500 mg/L |
| $NaHPO_4$ | 2.7 mg/L |

FIG.9

|  | INFLUENT WASTEWATER | TREATED WATER |
|---|---|---|
| $NH_4-N$ (mg/L) | 705 | 8 |
| $NO_2-N$ (mg/L) | 1.2 | 16 |
| $NO_3-N$ (mg/L) | 0.9 | 67 |

FIG.10

| OPERATION WATER TEMPERATURE (°C) | OPERATION LOAD kg-N/m³/d | DENITRIFICATION CARRIER VOLUME FRACTION | | | | | |
|---|---|---|---|---|---|---|---|
| | | 75% | 65% | 50% | 40% | 25% | 20% |
| 15-20 | 1.0~1.5 | B NH4 | A | B NO2 | C NO2 | C NO2 | C NO2 |
| 20-25 | 1.3~1.8 | C NH4 | B NH4 | A | B NO2 | C NO2 | C NO2 |
| 25-37 | 1.7~2.8 | C NH4 | C NO2 | B NH4 | A | A | B NO2 |

FIG.12

| | INFLOW | ONE-TANK OPERATION (EXAMPLE) | | TWO-TANK OPERATION (COMPARATIVE EXAMPLE) | |
|---|---|---|---|---|---|
| | AVERAGE (mg/L) | MEASURED VALUE (mg/L) | AVERAGE (mg/L) | MEASURED VALUE (mg/L) | AVERAGE (mg/L) |
| NH4-N | 705 | 5.8~11 | 7.4 | 8~47 | 32 |
| NO2-N | 1.2 | 17~25 | 20 | 17~32 | 21 |
| NO3-N | 0.9 | 60~71 | 67 | 52~70 | 62 |

WASTEWATER TREATMENT METHOD AND WASTEWATER TREATMENT APPARATUS

BACKGROUND OF THE INVENTION

1. Field of the Invention

The presently disclosed subject matter relates to a wastewater treatment method and a wastewater treatment apparatus, and particularly relates to a method for treating wastewater containing ammonium nitrogen and a treatment apparatus therefor.

2. Description of the Related Art

In recent years, a method including denitrification treatment with the use of anaerobic ammonium-oxidizing bacteria (anaerobic ammonium oxidation method) has drawn attention as a method for treating wastewater containing ammonium nitrogen. This method includes nitriting the ammonium nitrogen in the wastewater into nitrite with nitrifying bacteria in a nitrification tank, and then simultaneously denitrifying the nitrite and the ammonium nitrogen in the wastewater in the denitrification tank with the anaerobic ammonium-oxidizing bacteria. The method does not need the supply of an organic substance from the outside for a denitrification reaction, and accordingly can efficiently perform wastewater treatment.

A simultaneous denitrification reaction in an anaerobic ammonium oxidation method proceeds according to the following reaction formula. Accordingly, in order to reliably decompose and remove the ammonium nitrogen in the wastewater, it is necessary to control the ratio of the ammonium nitrogen and the nitrite nitrogen in the denitrification tank based on the stoichiometric ratio in the following reaction formula. For this reason, the nitrification rate in the nitrification tank has been needed to be strictly controlled.

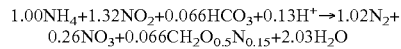

$$1.00NH_4 + 1.32NO_2 + 0.066HCO_3 + 0.13H^+ \rightarrow 1.02N_2 + 0.26NO_3 + 0.066CH_2O_{0.5}N_{0.15} + 2.03H_2O$$

Then, a method (so-called CANON method) is proposed which allows both of the nitrification reaction and the denitrification reaction to proceed in the treatment tank in which the nitrifying bacteria and the anaerobic ammonium-oxidizing bacteria coexist, under an aerobic condition (Third, K. A., Sliekers, A. O., Kuenen, J. G., Jetten, M. S. M., 2001 The CANON system (completely autotrophic nitrogen-removal over nitrite) under ammonium, limitation: interaction and competition between three groups of bacteria. Syst. Appl. Microbiol. 24(4), 588-596, for instance). This method can reliably decompose and remove the ammonium nitrogen in the wastewater even without strictly controlling the nitrification rate because the nitrifying bacteria and the anaerobic ammonium-oxidizing bacteria which coexist in one treatment tank tend to keep balance with each other.

The CANON method needs to make the nitrifying bacteria and the anaerobic ammonium-oxidizing bacteria coexist in one treatment tank. For this reason, a method is proposed which makes both of the nitrifying bacteria and the anaerobic ammonium-oxidizing bacteria coexist in one biofilm, and treats the wastewater with the biofilm.

For instance, Japanese Patent Application Laid-Open No. 2001-293494 describes a method of treating wastewater with the use of a carrier (sponge) in which both of the nitrifying bacteria and the anaerobic ammonium-oxidizing bacteria have been immobilized.

In addition, Japanese Patent Application Laid-Open No. 2004-230225 describes a method of preparing a carrier (double-structure carrier) formed of a biofilm with a double structure which has the anaerobic ammonium-oxidizing bacteria entrapped and immobilized therein, and has the nitrifying bacteria attached thereon, and treating wastewater with the use of the carrier.

SUMMARY OF THE INVENTION

However, the methods described in Japanese Patent Application Laid-Open No. 2001-293494 and Japanese Patent Application Laid-Open No. 2004-230225 have difficulty in controlling the ratio of the bacterial loads of the nitrifying bacteria and the anaerobic ammonium-oxidizing bacteria, make one of a nitrification reaction and a denitrification reaction become a rate-limiting factor and eventually cannot treat wastewater rapidly.

The presently disclosed subject matter has been made in view of the above described circumstances, and an object thereof is to provide a wastewater treatment method and a wastewater treatment apparatus which can perform wastewater treatment rapidly and stably with nitrifying bacteria and anaerobic ammonium-oxidizing bacteria that coexist in one treatment tank.

A wastewater treatment method according to an aspect of the presently disclosed subject matter is a method for treating wastewater containing ammonium nitrogen, including the steps of: preparing a treatment tank in which nitrification carrier having made nitrifying bacteria dominant therein and a denitrification carrier having made anaerobic ammonium-oxidizing bacteria dominant therein are mixed; oxidizing, in the treatment tank, the ammonium nitrogen contained in the wastewater to nitrite with the nitrifying bacteria in a nitrification carrier; and denitrifying the nitrite formed through the oxidation of the ammonium nitrogen with the anaerobic ammonium-oxidizing bacteria in the denitrification carrier in the treatment tank, while using the ammonium nitrogen in the wastewater as a hydrogen donor.

It has been conventionally thought necessary to use a biofilm in which the nitrifying bacteria and the anaerobic ammonium-oxidizing bacteria coexist, when allowing a nitrification reaction and a denitrification reaction to proceed in one treatment tank. In such circumstances, the present inventors have made an extensive investigation, and as a result, found that the nitrification reaction and the denitrification reaction can be allowed to proceed in one treatment tank, by immobilizing the nitrifying bacteria and the anaerobic ammonium-oxidizing bacteria in separate carriers, respectively, and making these two kinds of carriers mixed (co-exist) in the one tank. The above described wastewater treatment method was achieved on the basis of the above described findings of the present inventors.

In the above described wastewater treatment method, control of the ratio of the bacterial loads of nitrifying bacteria and anaerobic ammonium-oxidizing bacteria can be easily performed, by immobilizing the nitrifying bacteria and the anaerobic ammonium-oxidizing bacteria in separate carriers, respectively (nitrification carrier and denitrification carrier) and by controlling a volume ratio (ratio of the feeding amounts) of the nitrification carrier and the denitrification carrier. Accordingly, the method can prevent one of the nitrification reaction and the denitrification reaction from becoming a rate-limiting factor, and can rapidly perform wastewater treatment.

The wastewater treatment method may further include the steps of: feeding the denitrification carrier into the treatment tank; feeding an unacclimated carrier containing the nitrifying bacteria into the treatment tank into which the denitrification carrier has been fed; and acclimating the nitrifying bacteria contained in the a carrier in the treatment tank to obtain the denitrification carrier.

The anaerobic ammonium-oxidizing bacteria which are dominant in the denitrification carrier have a certain degree of resistance to dissolved oxygen. Accordingly, the method can acclimate the nitrification carrier without deactivating the anaerobic ammonium-oxidizing bacteria in the denitrification carrier, by feeding the denitrification carrier having made the anaerobic ammonium-oxidizing bacteria dominant therein in advance into the treatment tank, and then, acclimating the nitrifying bacteria which are aerobic bacteria in the treatment tank.

The wastewater treatment method may further include the steps of: attaching a separating plate in the treatment tank to separate the treatment tank into a first acclimation chamber and a second acclimation chamber; feeding a first carrier containing the nitrifying bacteria to the first acclimation chamber; feeding a second carrier containing the anaerobic ammonium-oxidizing bacteria to the second acclimation chamber; acclimating the nitrifying bacteria contained in the first carrier in the first acclimation chamber to obtain the nitrification carrier; acclimating the anaerobic ammonium-oxidizing bacteria contained in the second carrier in the second acclimation chamber to obtain the denitrification carrier; and detaching the separating plate after having acclimated the nitrifying bacteria and the anaerobic ammonium-oxidizing bacteria.

Thus, the nitrifying bacteria and the anaerobic ammonium-oxidizing bacteria can be reliably acclimated by acclimating the nitrifying bacteria which are aerobic bacteria and the anaerobic ammonium-oxidizing bacteria which are anaerobic bacteria in the first acclimation chamber and the second acclimation chamber, respectively. In addition, space can be saved because the nitrifying bacteria and the anaerobic ammonium-oxidizing bacteria can be acclimated only in the treatment tank which is used for operating wastewater treatment.

In the wastewater treatment method, at least one of the nitrification carrier and the denitrification carrier is preferably entrapping immobilization pellets.

When entrapping immobilization pellets are used as a carrier, the bacterial load can be reliably controlled, because the peeling of a biofilm, which can occur in the case of attachment immobilization pellets, does not occur. In addition, when entrapping immobilization pellets are used, the pellets can be comparatively easily acclimated, because the return of sludge is unnecessary in the acclimation.

In the wastewater treatment method, it is preferable to maintain the concentration of dissolved oxygen in the treatment tank at 1 mg/L or more and 4 mg/L or less, in the step of oxidizing the ammonium nitrogen to the nitrite and the step of denitrifying the nitrite.

By maintaining the concentration of dissolved oxygen (DO) in the above described range, the wastewater treatment can be performed stably and rapidly.

In the wastewater treatment method, preferably, the rate of the nitrification reaction which oxidizes the ammonium nitrogen to the nitrite is 1.1 $kg\cdot N\cdot m^{-3}\cdot day^{-1}$ or more and the rate of the denitrification reaction which denitrifies the nitrite is 2.0 $kg\cdot N\cdot m^{-3}\cdot day^{-1}$ or more.

A wastewater treatment apparatus according to another aspect of the presently disclosed subject matter includes a treatment tank in which a nitrification carrier having made nitrifying bacteria dominant therein and a denitrification carrier having made anaerobic ammonium-oxidizing bacteria dominant therein are mixed.

When the above described wastewater treatment apparatus is employed, the ratio of the bacterial loads of the nitrifying bacteria and anaerobic ammonium-oxidizing bacteria can be easily controlled by adjusting the volume ratio (ratio of the feeding amounts) of the nitrification carrier and the denitrification carrier. Accordingly, the apparatus can prevent one of a nitrification reaction and a denitrification reaction from becoming a rate-limiting factor and can rapidly perform wastewater treatment.

The wastewater treatment apparatus preferably further includes a separating plate which is removably attached to the treatment tank to separate the treatment tank into a first acclimation chamber for acclimating the nitrification carrier therein and a second acclimation chamber for acclimating the denitrification carrier therein.

Thereby, the wastewater treatment apparatus can acclimate the nitrifying bacteria which are aerobic bacteria and the anaerobic ammonium-oxidizing bacteria which are anaerobic bacteria in the first acclimation chamber and the second acclimation chamber, respectively, in a state in which the treatment tank is separated into the first acclimation chamber and the second acclimation chamber by the separating plate. In addition, the wastewater treatment apparatus can be made compact because the nitrifying bacteria and the anaerobic ammonium-oxidizing bacteria can be acclimated only in the one treatment tank which is used for operating wastewater treatment.

The wastewater treatment apparatus preferably further includes: a baffle plate which is arranged so as to separate the treatment tank into the first treatment chamber and the second treatment chamber, and so as to form a communicating path which allows the first treatment chamber and the second treatment chamber to communicate in the upper part and the bottom part of the treatment tank; and an air-diffusing unit which aerates and stirs the wastewater, and is provided in one of the first treatment chamber and the second treatment chamber so as to form a swirling flow of the wastewater in the treatment tank through the communicating path.

Thereby, dissolved oxygen can be supplied to the wastewater in the treatment tank and the carrier in the treatment tank can also be allowed to flow, using the swirling flow of the wastewater formed in the treatment tank only by preparing the air-diffusing unit in one of the first treatment chamber and the second treatment chamber. Accordingly, the energy necessary for the operation of wastewater treatment can be reduced.

In the wastewater treatment apparatus, at least one of the nitrification carrier and the denitrification carrier is preferably entrapping immobilization pellets.

When an entrapping immobilization pellets are used as a carrier, the bacterial load can be reliably controlled, because the peeling of a biofilm, which can occur in the case of attachment immobilization pellets, does not occur. In addition, when entrapping immobilization pellets are used, the pellets can be comparatively easily acclimated, because the return of sludge is unnecessary in the acclimation.

The wastewater treatment apparatus preferably further includes: an air-diffusing unit which aerates and stirs the wastewater in the treatment tank; and a control unit which controls the air-diffusing unit so that the amount of dissolved oxygen in the treatment tank is 1 mg/L or more and 4 mg/L or less.

By maintaining the concentration of dissolved oxygen (DO) in the above described range, wastewater treatment can be performed stably and rapidly.

According to the presently disclosed subject matter, wastewater treatment is performed with the use of a treatment tank in which a nitrification carrier having made nitrifying bacteria dominant therein and a denitrification carrier having made anaerobic ammonium-oxidizing bacteria dominant therein are mixed (co-exist). Accordingly, the method can prevent one of a nitrification reaction and a denitrification reaction from becoming a rate-limiting factor by adjusting the volume ratio (ratio of the feeding amounts) of the nitrification carrier and the denitrification carrier in the treatment tank, and can rapidly perform wastewater treatment.

BRIEF DESCRIPTION OF THE DRAWINGS

FIG. 7 is a table showing the water quality of an ammonium wastewater which has been used for acclimating a nitrification carrier;

FIG. 8 is a table showing the water quality of a synthetic wastewater which has been used for acclimating a denitrification carrier;

FIG. 9 is a table showing the result of wastewater treatment in Example 1;

FIG. 10 is a table showing the result of wastewater treatment in Example 2;

FIG. 12 is a table showing the result of wastewater treatment in Example 5.

DETAILED DESCRIPTION OF THE PREFERRED EMBODIMENTS

The embodiments according to the presently disclosed subject matter will be described below with reference to the attached drawings.

Figure 1:
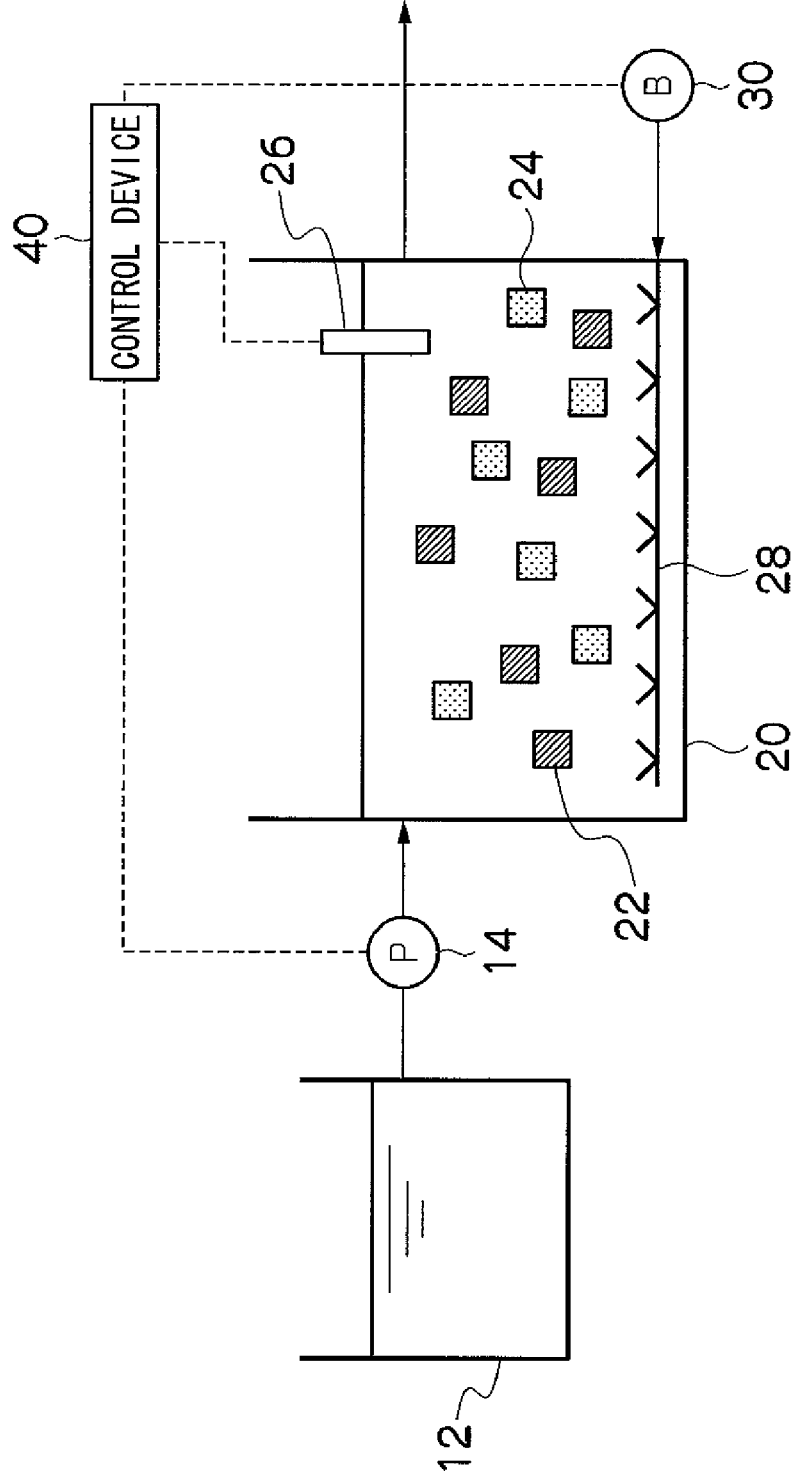
FIG. 1 is a block diagram illustrating one example of a wastewater treatment apparatus according to an embodiment of the presently disclosed subject matter.

FIG. 1 is a block diagram illustrating one example of a wastewater treatment apparatus according to an embodiment. As is illustrated in FIG. 1, a wastewater treatment apparatus 10 mainly includes: a raw water tank 12 in which wastewater to be treated (raw wastewater) is stored; a treatment tank 20 in which the sent wastewater from the raw water tank 12 is treated; and a control device 40 which controls each section in the wastewater treatment apparatus 10.

The wastewater which is stored in the raw water tank 12 is wastewater containing at least ammonium nitrogen, and may contain nutrient salts of nitrogen, phosphorus, carbon and the like, in addition to the ammonium nitrogen. The raw water tank 12 is connected to the treatment tank 20, and is configured so that the wastewater can be supplied to the treatment tank 20 therefrom by the pump 14.

It has been conventionally thought necessary to use a biofilm in which the nitrifying bacteria and the anaerobic ammonium-oxidizing bacteria coexist, when allowing a nitrification reaction and a denitrification reaction to proceed in one treatment tank. In such circumstances, the present inventors have made an extensive investigation, and as a result, found that the nitrification reaction and the denitrification reaction can be allowed to proceed in one treatment tank, by immobilizing the nitrifying bacteria and the anaerobic ammonium-oxidizing bacteria in each independent carrier and making these two kinds of carriers mixed in the tank. The wastewater treatment apparatus 10 according to the present embodiment is based on the above described findings of the present inventors, and the nitrification carrier 22 having the nitrifying bacteria (ammonium oxidation bacterium) dominantly accumulated therein and the denitrification carrier 24 having the anaerobic ammonium-oxidizing bacteria dominantly accumulated therein are mixed in the treatment tank 20. In other words, the nitrifying bacteria and the anaerobic ammonium-oxidizing bacteria are immobilized in each different carrier from the other (nitrification carrier 22 and denitrification carrier 24).

Thus, by immobilizing the nitrifying bacteria and the anaerobic ammonium-oxidizing bacteria in carriers different from each other, the ratio of the bacterial loads of the nitrifying bacteria and the anaerobic ammonium-oxidizing bacteria can be easily controlled, through adjusting the volume ratio (ratio of the feeding amounts) of the nitrification carrier 22 and the denitrification carrier 24. Accordingly, the method prevents one of the nitrification reaction and the denitrification reaction from becoming a rate-limiting factor, and can rapidly perform the wastewater treatment.

In addition, in the case of a double-structure carrier (carrier described in Japanese Patent Application Laid-Open No. 2004-230225, for instance) which makes one of the nitrifying bacteria and the anaerobic ammonium-oxidizing bacteria entrapped and immobilized in its inner part and has the other bacteria attached on the surface of the carrier, the diffusion of a raw material into the inner layer of the carrier becomes a rate-limiting factor and a sufficient rate of wastewater treatment can not be eventually obtained. This is because when the outer layer in which one species of bacteria inhabit is thick, the raw material for the reaction cannot rapidly diffuse into the inner layer in which the other species of bacteria inhabit. In contrast to this, when the nitrifying bacteria and the anaerobic ammonium-oxidizing bacteria are immobilized on different carriers from each other (nitrification carrier 22 and denitrification carrier 24) as in the present embodiment, the decrease in the rate of the wastewater treatment caused by the diffusion rate limitation of the raw material for the reaction does not occur.

In addition, in the case of the double-structure carrier, the outer layer of the carrier exfoliates, and the bacteria which inhabit in the outer layer eventually flow out from the treatment tank. Then, the balance between bacterial loads of the nitrifying bacteria and the anaerobic ammonium-oxidizing bacteria is disrupted, which eventually results in causing unstable wastewater treatment. In contrast to this, when the nitrifying bacteria and the anaerobic ammonium-oxidizing bacteria are immobilized in separate carriers, respectively (nitrification carrier 22 and denitrification carrier 24) as in the present embodiment, the balance between the bacterial loads of the nitrifying bacteria and the anaerobic ammonium-oxidizing bacteria can be stably maintained.

The nitrifying bacteria accumulated in the nitrification carrier 22 and the anaerobic ammonium-oxidizing bacteria accumulated in the denitrification carrier 24 coexist in the treatment tank 20. Thereby, both of the nitrification reaction due to the nitrification carrier 22 and the denitrification reaction due to the denitrification carrier 24 are allowed to proceed in the treatment tank 20, and can decompose ammonium nitrogen in wastewater to nitrogen gas. Here, the nitrification reaction means a reaction which oxidizes the ammonium nitrogen in the wastewater into nitrite with the use of the nitrifying bacteria, and the denitrification reaction means a reaction which denitrifies the nitrite formed through the nitrification reaction with the anaerobic ammonium-oxidizing bacteria, while using the ammonium nitrogen in the wastewater as a hydrogen donor.

The nitrification carrier 22 is not limited in particular as long as the nitrifying bacteria are immobilized in the nitrification carrier 22, and may be immobilization pellets or a contact filter medium. The nitrifying bacteria to be immobilized on the nitrification carrier 22 may employ bacteria separated from microorganisms in activated sludge or the like. The nitrification carrier 22 may also employ activated sludge containing microbial colonies in which the nitrifying bacteria are grown dominantly.

In addition, entrapping immobilization pellets which have the nitrifying bacteria entrapped and immobilized in its inner part is preferably used as the immobilization pellet type of the nitrification carrier 22. The entrapping immobilization pellets, if being used, can reliably control the bacterial load, because an exfoliation of the biofilm does not occur, which can occur in the case of the attachment immobilization pellets. In addition, when the entrapping immobilization pellets are used, the return of sludge is unnecessary in the acclimation step, so the bacteria can be comparatively easily acclimated.

The immobilizing material of the nitrification carrier 22 is not limited in particular, but includes gels of polyvinyl alcohol, alginic acid, polyethylene glycol and the like, and plastics such as cellulose, polyester, polypropylene and polyvinyl chloride, for instance. The shape of the nitrification carrier 22 may be, for instance, a spherical shape, a cylindrical shape or a cubic shape, and may be formed into a porous structure, a honeycomb structure or a sponge-like structure. Alternatively, a granule carrier with the use of the self-granulation of a microorganism may be used as the nitrification carrier 22. Contact filter media which can be used for the nitrification carrier 22 can include those made from polyvinyl chloride and polyethylene.

The denitrification carrier 24 is not limited in particular as long as the anaerobic ammonium-oxidizing bacteria are immobilized in the denitrification carrier 24, and may be immobilization pellets or a contact filter medium.

In addition, the immobilization pellets to be used for the denitrification carrier 24 may be an entrapping immobilization pellets which have the anaerobic ammonium-oxidizing bacteria entrapped and immobilized in its inner part, or attachment depositing immobilization pellets which have the anaerobic ammonium-oxidizing bacteria attached and immobilized on its surface. Among them, the entrapping immobilization pellets are preferably used as the denitrification carrier 24. The entrapping immobilization pellets, if being used, can reliably control the bacterial load, because an exfoliation of the biofilm does not occur, which can occur in the case of the attachment immobilization pellets. The entrapping immobilization pellets can reliably hold bacteria in the treatment tank, and accordingly are suitable for a carrier for immobilizing precious anaerobic ammonium-oxidizing bacteria therein which are obtained by culture. Furthermore, when the entrapping immobilization pellets are used, the return of sludge is unnecessary in the acclimation step, so the bacteria can be comparatively easily acclimated.

The immobilizing material of the denitrification carrier 24 is not limited in particular, but includes gels of polyvinyl alcohol, alginic acid, polyethylene glycol and the like, and plastics such as cellulose, polyester, polypropylene and polyvinyl chloride, for instance. The shape of the denitrification carrier 24 may be, for instance, a spherical shape, a cylindrical shape or a cubic shape. The denitrification carrier 24 may be formed into a porous structure, a honeycomb structure or a sponge-like structure. Alternatively, a granule carrier with the use of the self-granulation of a microorganism may be used as the denitrification carrier 24. Contacting filter media which can be used for the denitrification carrier 24 can include those made from polyvinyl chloride and polyethylene.

The total volume of the nitrification carrier 22 and the denitrification carrier 24 is preferably 10 to 40% of the volume of the wastewater in the treatment tank 20, and more preferably is 15 to 25%. The volume fraction X of the denitrification carrier 24 in the total volume of the nitrification carrier 22 and the denitrification carrier 24 in the treatment tank 20 is preferably controlled according to the water temperature in the treatment tank 20. In particular, the volume fraction X of the denitrification carrier 24 is preferably controlled to be 50 to 75% when the water temperature is 15 to 20° C., 40 to 65% when the water temperature is 20 to 25° C., and 20 to 50% when the water temperature is 25 to 37° C.

As is illustrated in FIG. 1, the treatment tank 20 is provided with a sensor 26 which measure the quality of the wastewater in the treatment tank 20. The sensor 26 is configured to be capable of measuring, for instance, the concentrations of ammonium, nitrite and nitrate, the quantity of dissolved oxygen, and pH. The results measured by the sensor 26 are sent to the control device 40, and each section in the wastewater treatment apparatus 10 is controlled on the basis of these measurement results.

The treatment tank 20 is provided with an air-diffusing unit 28, and is structured so that air is supplied from a blower 30 through the air-diffusing unit 28. Thereby, the air-diffusing unit 28 aerates and stirs the wastewater in the treatment tank 20, and simultaneously can supply dissolved oxygen into the wastewater.

The control device 40 controls the blower 30 so that the amount of the dissolved oxygen in the wastewater in the treatment tank 20 is preferably 1.0 mg/L or more and 4.0 mg/L or less (more preferably 1.5 mg/L or more and 3.0 mg/L or less). When the amount of the dissolved oxygen is excessively high, the activity of the anaerobic ammonium-oxidizing bacteria decreases which are aerobic bacteria. On the other hand, when the amount of the dissolved oxygen is excessively low, the activity of the nitrifying bacteria decreases which are aerobic bacteria. By maintaining the amount of the dissolved oxygen of the wastewater in the treatment tank 20 in the above described range, the activities of the nitrifying bacteria and the anaerobic ammonium-oxidizing bacteria can be maintained, and the wastewater treatment can be rapidly performed.

The nitrite concentration in the treatment tank 20 is preferably maintained at 1 to 280 mg/L, and more preferably maintained at 2 to 100 mg/L. The ammonium concentration in the treatment tank 20 is preferably maintained at 1 to 100 mg/L, and more preferably maintained at 1 to 20 mg/L.

The nitrite concentration and the ammonium concentration in the treatment tank 20 can be controlled by allowing the control device 40 to control the pump 14 to change the retention time (hydrological retention time) of the wastewater in the treatment tank 20.

Next, a method of making a nitrification carrier 22 having made nitrifying bacteria dominant therein and a denitrification carrier 24 having made anaerobic ammonium-oxidizing bacteria dominant therein be mixed in a treatment tank 20 will be described.

The nitrification carrier 22 having made the nitrifying bacteria dominant therein is a carrier in which acclimated nitrifying bacteria are immobilized. In the nitrification carrier 22, for instance, the nitrifying bacteria are acclimated so that the rate of treating ammonium nitrogen per unit volume is 4 kg-N/m$^3$-carrier/day or more. The "nitrification carrier 22" means an acclimated nitrification carrier 22, unless otherwise specified. On the other hand, an unacclimated nitrification carrier 22 means a carrier having a rate of treating ammonium nitrogen per unit volume of 0.5 kg-N/m$^3$-carrier/day or less.

The denitrification carrier 24 having made anaerobic ammonium-oxidizing bacteria dominant therein is a carrier in which acclimated anaerobic ammonium-oxidizing bacteria are immobilized. In the denitrification carrier 24, for instance, the anaerobic ammonium-oxidizing bacteria are acclimated so that the rate of treating ammonium nitrogen and nitrite nitrogen per unit volume is 5 kg-N/m$^3$-carrier/day or more. The "denitrification carrier 24" means an already acclimated denitrification carrier 24, unless otherwise specified. On the other hand, an unacclimated denitrification carrier 24 means a carrier having a rate of treating ammonium nitrogen and nitrite nitrogen per unit volume of 2.5 kg-N/m$^3$-carrier/day or less.

As for the nitrification carrier 22 and the denitrification carrier 24 which are mixed in the treatment tank 20, the acclimated nitrification carrier 22 and the acclimated denitrification carrier 24 may be fed (charged) into the treatment tank 20, or one of the nitrification carrier 22 and the denitrification carrier 24 may be acclimated in the wastewater treatment apparatus 10.

For instance, an unacclimated nitrification carrier 22 and an acclimated denitrification carrier 24 may be fed into the treatment tank 20, and then the nitrification carrier 22 may be subsequently acclimated by maintaining the inside of the treatment tank 20 in an aerobic condition. Anaerobic ammonium-oxidizing bacteria contained in the acclimated denitrification carrier 24 have a certain degree of resistance to dissolved oxygen. Accordingly, the nitrifying bacteria can be made dominant in the nitrification carrier 22 without deactivating the anaerobic ammonium-oxidizing bacteria in the denitrification carrier 24, by feeding the denitrification carrier 24 having made the anaerobic ammonium-oxidizing bacteria dominant therein and the unacclimated nitrification carrier 22 into the treatment tank 20 and then by acclimating the nitrification carrier 22.

Figure 2:
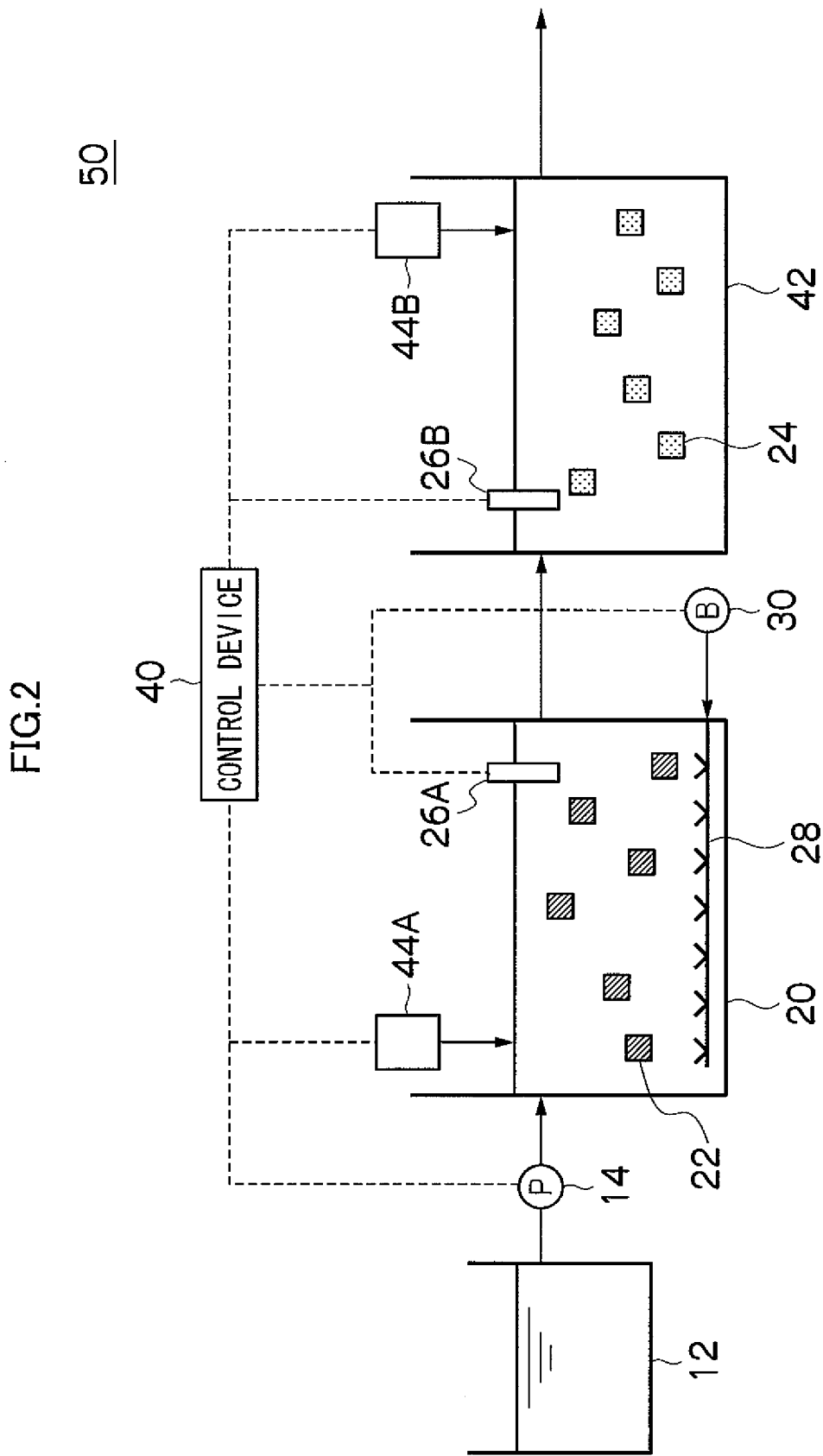
FIG. 2 is a block diagram illustrating one example of a wastewater treatment apparatus for acclimating a nitrification carrier and a denitrification carrier.
Figure 3:
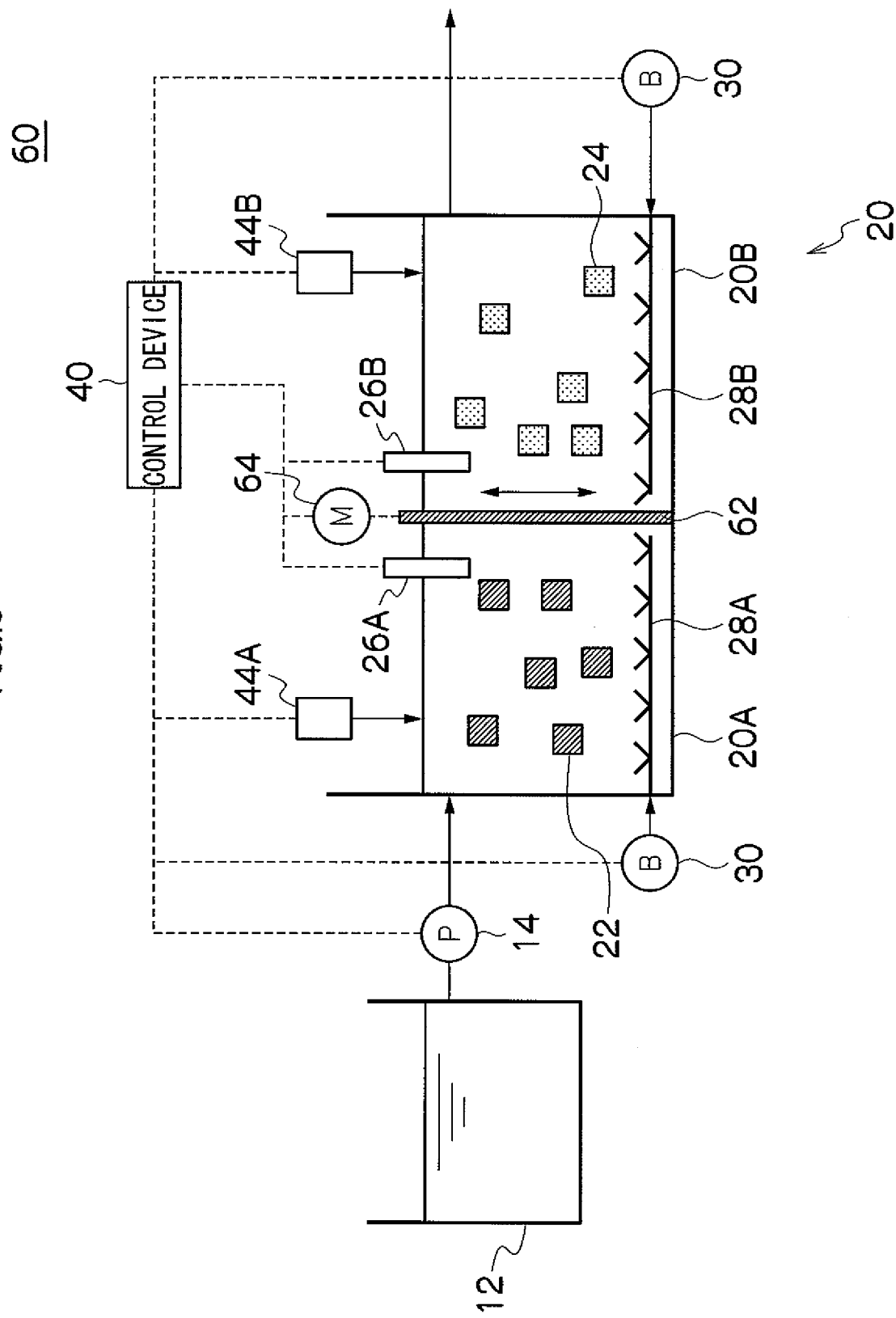
FIG. 3 is a block diagram illustrating another example of a wastewater treatment apparatus for acclimating a nitrification carrier and a denitrification carrier.

Alternatively, the unacclimated nitrification carrier 22 and the unacclimated denitrification carrier 24 may be acclimated in a wastewater treatment apparatus according to a procedure which will be described below. FIG. 2 is a block diagram illustrating one example of a wastewater treatment apparatus for acclimating the nitrification carrier 22 and the denitrification carrier 24. FIG. 3 is a block diagram illustrating another example of a wastewater treatment apparatus for acclimating the nitrification carrier 22 and the denitrification carrier 24. In FIGS. 2 and 3, components common to the wastewater treatment apparatus 10 illustrated in FIG. 1 are referenced using the same reference numerals, and the description thereof is omitted here.

As is illustrated in FIG. 2, a wastewater treatment apparatus 50 is different from the wastewater treatment apparatus 10 in that the wastewater treatment apparatus 50 has an acclimation tank 42 in which the denitrification carrier 24 is acclimated, in the subsequent stage of the treatment tank 20.

In order to acclimate the nitrification carrier 22 and the denitrification carrier 24 by using the wastewater treatment apparatus 50, firstly the unacclimated nitrification carrier 22 is fed into the treatment tank 20, and at the same time, the unacclimated denitrification carrier 24 is fed into the acclimation tank 42. Then, the nitrification carrier 22 and the denitrification carrier 24 are acclimated by maintaining the treatment tank 20 in an aerobic condition and also maintaining the acclimation tank 42 in an anaerobic condition.

At this time, it is preferable to control the amount of dissolved oxygen, the concentration of ammonium and pH in the treatment tank 20, and the amount of dissolved oxygen, the concentration of the ammonium, the concentration of the nitrite and pH in the acclimation tank 42, on the basis of the measurement results by the sensors 26 (26A and 26B).

In addition, as is illustrated in FIG. 2, the tanks 44 (44A and 44B) are preferably provided which supply ammonium, a nitrite and a neutralizing agent (sodium bicarbonate and/or hydrochloric acid, for instance) to the treatment tank 20 and the acclimation tank 42, according to the direction of the control device 40. Thereby, the concentration of the ammonium and pH in the treatment tank 20, and the concentration of the ammonium, the concentration of the nitrite and pH in the acclimation tank 42 can be automatically controlled according to the directions sent from the control device 40 to the tanks 44 on the basis of the measurement results by the sensors 26.

The wastewater treatment apparatus 50 can acclimate the nitrifying bacteria which are aerobic bacteria in the treatment tank 20 provided with the air-diffusing unit 28, and also can acclimate the anaerobic ammonium-oxidizing bacteria which are anaerobic bacteria in the acclimation tank 42 provided in the subsequent stage of the treatment tank 20.

The nitrification carrier 22 having made the nitrifying bacteria dominant therein and the denitrification carrier 24 having made the anaerobic ammonium-oxidizing bacteria dominant therein can be mixed (co-exist) in the treatment tank 20, by moving the denitrification carrier 24 to the treatment tank 20 from the acclimation tank 42 after having acclimated the nitrification carrier 22 and the denitrification carrier 24. However, the wastewater treatment apparatus 50 requires a large installation space because the acclimation tank 42 which is not used for the wastewater treatment operation is provided. Then, it is preferable to employ a wastewater treatment apparatus 60 illustrated in FIG. 3.

As is illustrated in FIG. 3, the wastewater treatment apparatus 60 is different from the wastewater treatment apparatus 10 in that the wastewater treatment apparatus 60 is provided with a separating plate 62 which is detachable (removable) in the treatment tank 20.

In order to acclimate the nitrification carrier 22 and the denitrification carrier 24 by using the wastewater treatment apparatus 60, firstly the treatment tank 20 is divided into a first acclimation chamber 20A and a second acclimation chamber 20B by the separating plate 62, an unacclimated nitrification carrier 22 is fed into the first acclimation chamber 20A, and at the same time, an unacclimated denitrification carrier 24 is fed into the second acclimation chamber 20B. Then, the nitrification carrier 22 and denitrification carrier 24 are acclimated by maintaining the first acclimation chamber 20A in an aerobic condition and also maintaining the second acclimation chamber 20B in an anaerobic condition.

At this time, it is preferable to control the amount of dissolved oxygen, the concentration of ammonium and pH in the first acclimation chamber 20A, and the amount of dissolved oxygen, the concentration of ammonium, the concentration of the nitrite and pH in the second acclimation chamber 20B, on the basis of the measurement results by sensors 26 (26A and 26B), in the same way as in the wastewater treatment apparatus 50 illustrated in FIG. 2.

In addition, as is illustrated in FIG. 3, the tanks 44 (44A and 44B) are preferably provided which supply ammonium, a nitrite and a neutralizing agent (sodium bicarbonate and/or hydrochloric acid, for instance) to the treatment tank 20 and the acclimation tank 42, according to the direction of the control device 40. Thereby, the concentration of the ammonium and pH in the first acclimation chamber 20A, and the concentration of the ammonium, the concentration of the nitrite and pH in the second acclimation chamber 20B can be automatically controlled according to the directions sent from the control device 40 to the tanks 44, on the basis of the measurement results by the sensors 26.

Thus, the nitrification carrier 22 and denitrification carrier 24 are acclimated, and then the separating plate 62 is detached. Thereby, the acclimated nitrification carrier 22 and the acclimated denitrification carrier 24 can be mixed in the treatment tank 20.

The separating plate 62 is attached and detached preferably by allowing the control device 40 to control a motor 64 which moves the separating plate 62 vertically (in a direction shown by an arrow in FIG. 3).

The wastewater treatment apparatus 60 can acclimate nitrifying bacteria which are aerobic bacteria in the first acclimation chamber 20A in an aerobic condition, and also can acclimate anaerobic ammonium-oxidizing bacteria which are anaerobic bacteria in the second acclimation chamber 20B in an anaerobic condition. In addition, the wastewater treatment apparatus can be made compact because the nitrifying bacteria and the anaerobic ammonium-oxidizing bacteria can be acclimated only in the treatment tank 20 for operating wastewater treatment.

The wastewater treatment method and the wastewater treatment apparatus according to one embodiment of the presently disclosed subject matter were described above, but the presently disclosed subject matter is not limited thereto, and of course, can be improved or modified in various ways in a range that does not deviate from the gist of the presently disclosed subject matter.

For instance, the example in which contents in the treatment tank 20 are aerated and stirred with the air-diffusing unit 28 is described in the above embodiment, but the wastewater in the treatment tank 20 may be stirred by using a swirling flow formed in the treatment tank 20.

Figure 4:
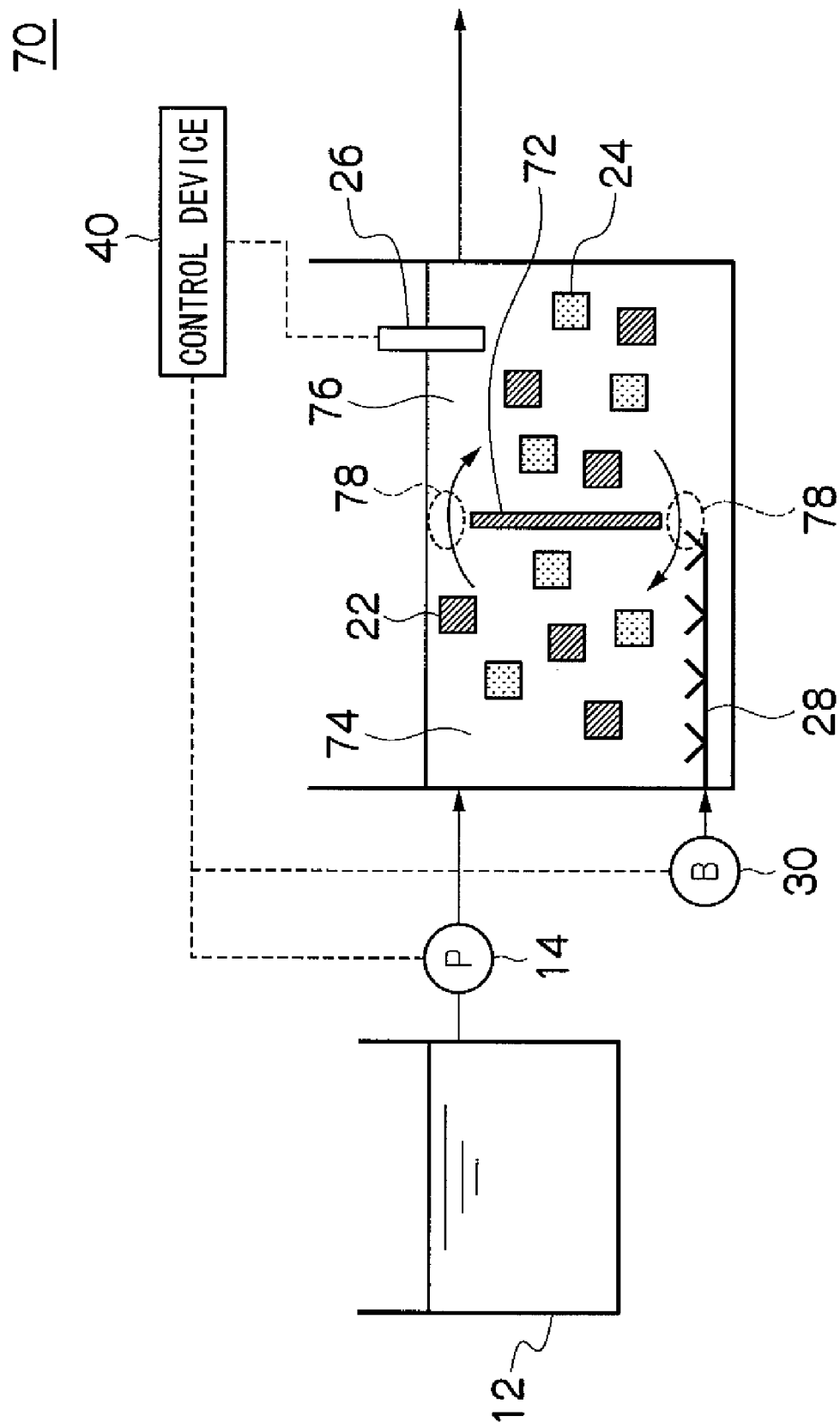
FIG. 4 is a block diagram illustrating one example of a wastewater treatment apparatus which stirs wastewater in a treatment tank by using a swirling flow.

FIG. 4 is a block diagram illustrating one example of the wastewater treatment apparatus which stirs wastewater in a treatment tank 20 by using the swirling flow. In FIG. 4, components common to the wastewater treatment apparatus 10 illustrated in FIG. 1 are referenced using the same reference numerals, and the description thereof is omitted here.

As is illustrated in FIG. 4, the wastewater treatment apparatus 70 is different from the wastewater treatment apparatus 10 in that the wastewater treatment apparatus 70 is provided with a baffle plate 72 which divides the treatment tank 20 into a first treatment chamber 74 and a second treatment chamber 76.

The baffle plate 72 is arranged so as to form communicating paths 78 which communicate the first treatment chamber 74 to the second treatment chamber 76 in the upper part and the bottom part of the treatment tank 20. The cross-sectional shape of the communicating path 78 may not be limited in particular, and may be a polygon such as a square and a rectangle, a circle or an ellipse. The communicating paths 78 may be each provided on the upper part and the bottom part of the treatment tank 20, or a plurality of communicating paths 78 may be provided on each of the upper part and the bottom part of the treatment tank 20.

An air-diffusing unit 28 is provided in one of the first treatment chamber 74 and the second treatment chamber 76, and the swirling flow of the wastewater can be formed in the treatment tank 20 through the communicating paths 78 by operating the air-diffusing unit 28.

Thereby, only by providing the air-diffusing unit 28 in one of the first treatment chamber 74 and the second treatment chamber 76, the treatment apparatus can supply dissolved oxygen into the wastewater of the treatment tank 20 while using a swirling flow of the wastewater formed in the treatment tank 20, and make the carrier in the treatment tank 20 flow. Accordingly, the energy necessary for the wastewater treatment operation can be reduced.

Figure 5:
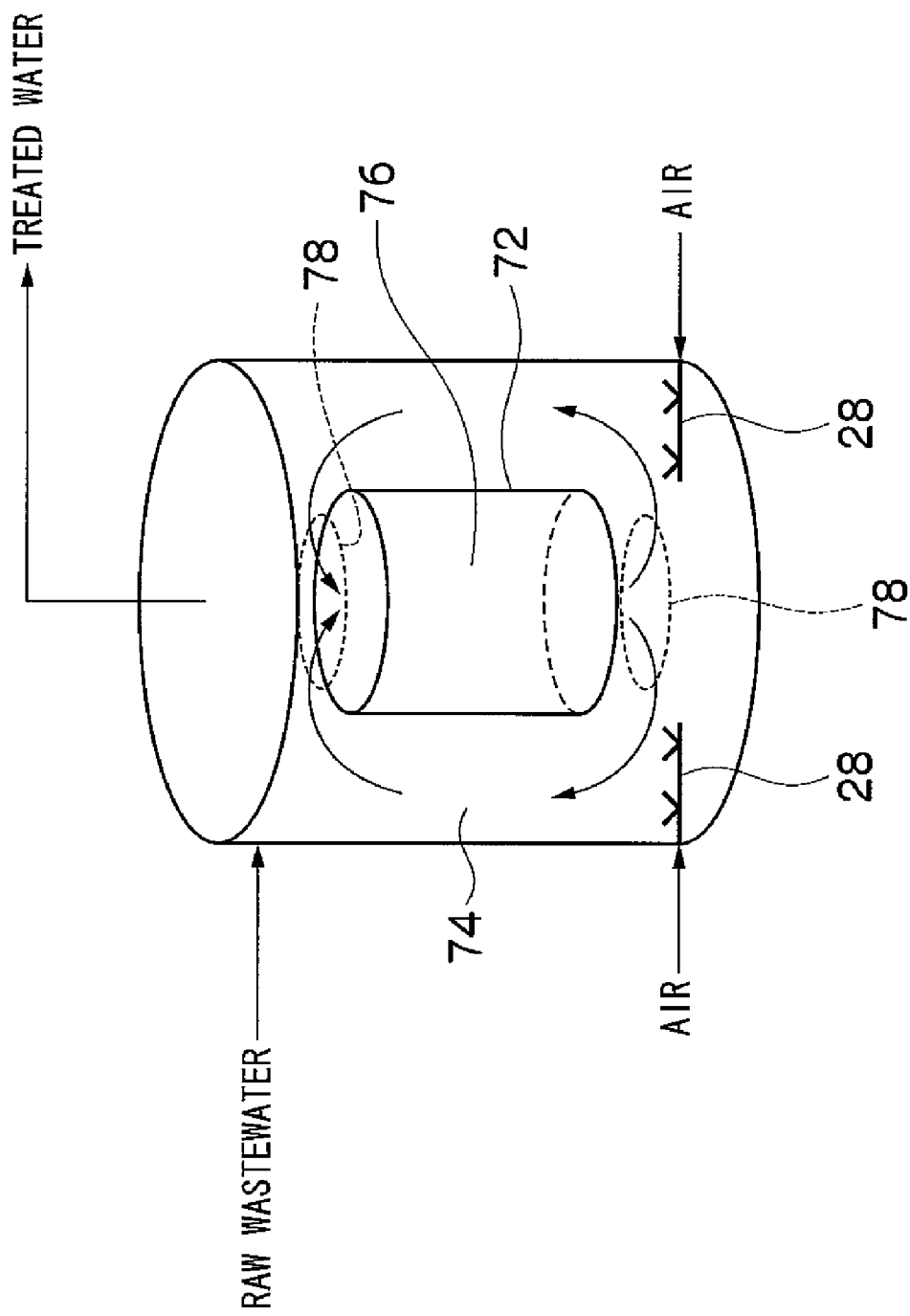
FIG. 5 is a block diagram illustrating another example of a wastewater treatment apparatus which stirs wastewater in a treatment tank by using a swirling flow.

FIG. 4 shows an example of forming the swirling flow of the wastewater in the treatment tank 20 with a flat baffle plate 72, but the shape of the baffle plate 72 is not limited to the example, and may have various shapes. For instance, as is illustrated in FIG. 5, a cylindrical baffle plate 72 may be arranged in the treatment tank 20 so as to form communicating paths 78, and an air-diffusing unit 28 may be provided in one of the first treatment chamber 74 and the second treatment chamber (in the example of FIG. 5, first treatment chamber 74). Then, the swirling flow of the wastewater in the treatment tank 20 is formed by the air-diffusing unit 28 through the communicating path 78.

Figure 6:
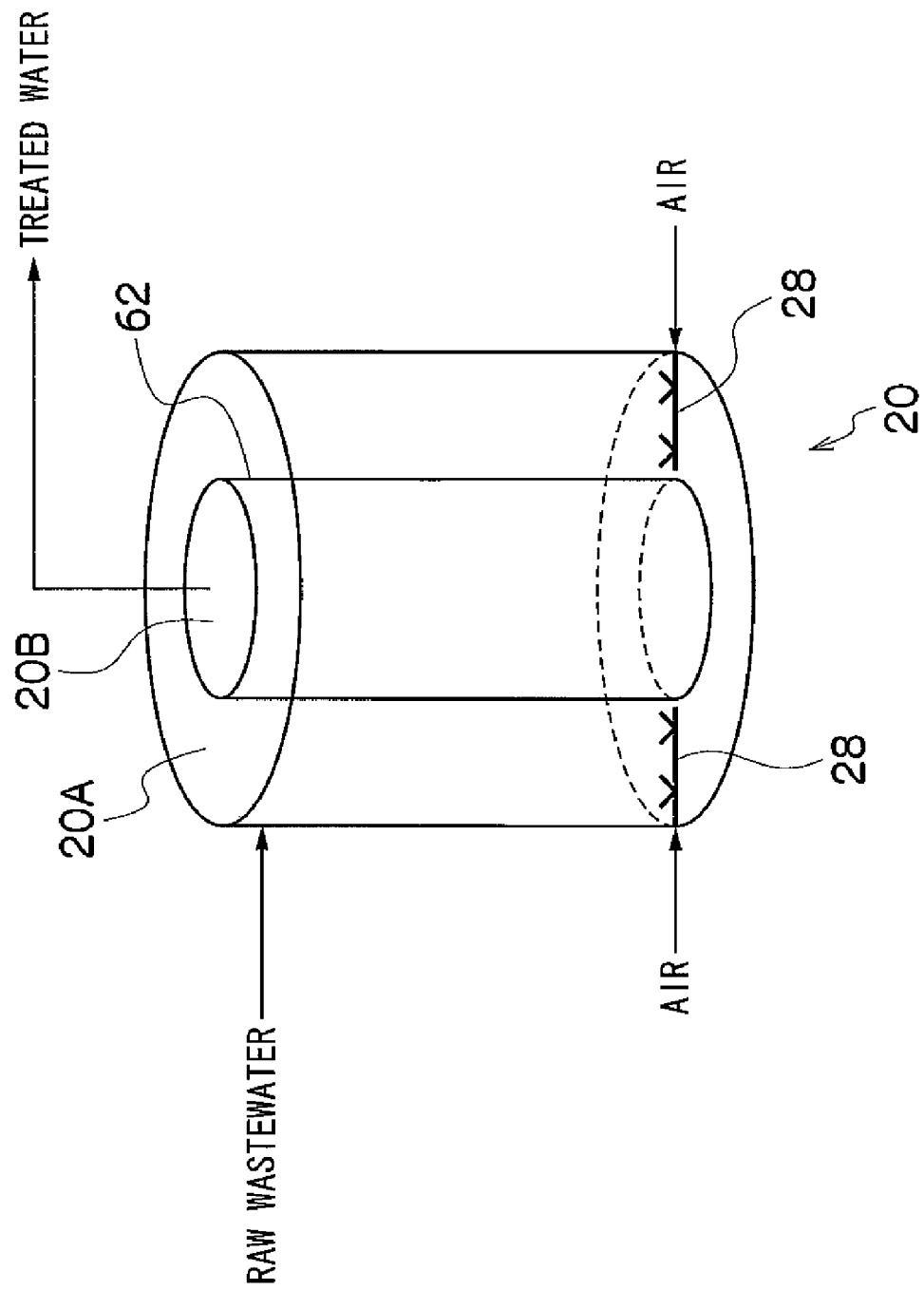
FIG. 6 is a block diagram illustrating another example of a wastewater treatment apparatus for acclimating a nitrification carrier and a denitrification carrier.

In addition, in an example described in the above embodiment, carriers are acclimated in a state in which the treatment tank 20 is divided into the first acclimation chamber 20A and the second acclimation chamber 20B with a flat separating plate 62, but the shape of the separating plate 62 is not limited to a flat shape, but can be in various shapes. For instance, the nitrification carrier 22 may be acclimated in the first acclimation chamber 20A in a state in which the treatment tank 20 is divided into the first acclimation chamber 20A and the second acclimation chamber 20B with a cylindrical separating plate 62 as is illustrated in FIG. 6, and at the same time, the denitrification carrier 24 may be acclimated in the second acclimation chamber 20B. FIG. 6 illustrates an example in which the outside of the cylindrical treatment tank 20 is defined as the first acclimation chamber 20A, and the inside of the treatment tank 20 is defined as the second acclimation chamber 20B, but it is needless to say that the inside of the treatment tank 20 may be defined as the first acclimation chamber 20A, and the outside of the treatment tank 20 may be defined as the second acclimation chamber 20B.

EXAMPLES

A feature of the presently disclosed subject matter will now be described more specifically below with reference to Examples. However, the scope of the presently disclosed subject matter should not be restrictively interpreted by the specific examples which will be described below.

Example 1

Preparation of Nitrification Carrier 22

An activated sludge containing nitrifying bacteria was entrapped and immobilized in a polyethylene glycol-based gel which had been molded into a cube of 3 mm square. The nitrification rate of the entrapping immobilization pellets at this time was 0.5 kg-N/$m^3$-carrier/day or less.

This entrapping immobilization pellets in an amount of 0.2 L were fed into a cylindrical reactor (culture tank) having a volumetric capacity of 2 L. A nitrification carrier 22 was prepared by making ammonium wastewater (inorganic synthetic wastewater) flow into this reactor and acclimating the nitrifying bacteria at a temperature maintained at 30° C. in the reactor for 1 month. FIG. 7 is a table showing the water quality of an ammonium wastewater which was used for acclimating nitrifying bacteria.

When the nitrifying bacteria were acclimated, the wastewater was aerated and stirred, the amount of dissolved oxygen (DO) in the reactor was maintained at 2 to 4 mg/L, and the pH was also maintained at 7.5 by the addition of a 5% solution of sodium bicarbonate. In an early period after the acclimation was started, the flow rate of the ammonium wastewater was controlled so that the retention time (hydrological retention time) was 24 hours, and then the retention time was shortened and the load was increased along with the increase in the activity of the nitrifying bacteria.

The nitrification rate (=ammonium removal rate=nitrite formation rate) of the above described entrapping immobilization pellets was measured under the condition that DO=3 mg/L and the water temperature was 26° C., 1 month after the start of the acclimation of the nitrifying bacteria, and as a result, the value was 7.0 kg-N/m$^3$-carrier/day.

In addition, as for the average water quality in a period of 1 to 2 months after the start of the acclimation of the nitrifying bacteria, the concentration of ammonium ($NH_4$—N) in the influent wastewater was 705 mg/L, the concentration of ammonium ($NH_4$—N) in the treated water was 300 mg/L, the concentration of nitrite ($NO_2$—N) in the treated water was 398 mg/L, and the concentration of nitrate ($NO_3$—N) in the treated water was 1 mg/L.

<Preparation of Denitrification Carrier 24>

Anaerobic ammonium-oxidizing bacteria were entrapped and immobilized in a polyethylene glycol-based gel which had been molded into a cube of 3 mm square. The nitrogen-removing rate of the entrapping immobilization pellets at this time was 2.5 kg-N/m$^3$-carrier/day or less.

This entrapping immobilization pellets in an amount of 0.2 L were fed into a cylindrical reactor (culture tank) having a volumetric capacity of 2 L. In addition, the used reactor had a structure for preventing air from entering the inside, and was provided with a stirrer. A denitrification carrier 24 was prepared by making a synthetic wastewater flow into this reactor and acclimating the anaerobic ammonium-oxidizing bacteria at a temperature maintained at 30° C. in the reactor for 2 months. FIG. 8 is a table showing the water quality of the synthetic wastewater which was used for acclimating the anaerobic ammonium-oxidizing bacteria.

When the denitrification carrier was acclimated, the pH of the wastewater was maintained at 7.5 by the addition of an HCl solution (0.2 N). In addition, in an early period after the acclimation was started, the flow rate of the wastewater was controlled so that the retention time (hydrological retention time) could be 12 hours, and the concentration of nitrogen was gradually increased along with the increase in the activity.

The denitrification rate (sum of the ammonium nitrogen removal rate and nitrite nitrogen removal rate) was measured under the condition that the water temperature was 30° C., 2 months after the start of the acclimation of the anaerobic ammonium-oxidizing bacteria, and as a result, the value was 18.0 kg-N/m$^3$-carrier/day.

<Nitrification Denitrification Test>

A wastewater treatment test on ammonium wastewater was conducted by using the nitrification carrier 22 and the denitrification carrier 24 which were prepared in the above described procedure. The nitrification carrier 22 and the denitrification carrier 24 each in an amount of 0.2 L were fed into the same reactor as was used for the preparation of the nitrification carrier 22. The synthetic wastewater having the water quality shown in FIG. 7 was made to flow into the reactor, and the wastewater was treated. While the wastewater was treated, the amount of the dissolved oxygen in the reactor was maintained at 2.0 to 3.0 mg/L.

FIG. 9 is a table showing the average water qualities of the influent wastewaters and treated waters which were sampled between 1 week and 3 months after the start of the wastewater treatment. It was proved from FIG. 9 that the ammonium in the reactor was almost completely treated, and the nitrite formed through a nitrification reaction was also denitrified through an anaerobic ammonium oxidation reaction (denitrification reaction).

Example 2

A nitrification carrier 22 and a denitrification carrier 24 were prepared under the same acclimation condition as in Example 1.

The obtained nitrification carrier 22 and the denitrification carrier 24 mixed in various ratios were loaded (packed) in the same reactor as in Example 1. Specifically, the volume fractions of the denitrification carrier 24 in the total volume of the nitrification carrier 22 and the denitrification carrier 24 were adjusted to 75%, 65%, 50%, 40%, 25% and 20%. In the above operation, the total volume of the nitrification carrier 22 and the denitrification carrier 24 was adjusted to 0.5 L in any case.

After this, a synthetic wastewater having the water quality shown in FIG. 7 was made to flow into the reactor, and a wastewater treatment operation was conducted under the same conditions as in Example 1. While the wastewater was treated, the amount of dissolved oxygen in the reactor was maintained at 2.0 to 3.0 mg/L. The water temperatures were adjusted to 15 to 20° C., 20 to 25° C. and 25 to 37° C., and the nitrogen loads were adjusted to 1.0 to 1.5 kg-N/m$^3$/day, 1.3 to 1.8 kg-N/m$^3$/day and 1.7 to 2.8 kg-N/m$^3$/day, respectively.

FIG. 10 is a table showing the results of the wastewater treatment. In FIG. 10, "A" indicates that the obtained nitrogen removal efficiency was 80% or more, "B" indicates that the obtained nitrogen removal efficiency was 50% or more and less than 80%, and "C" indicates that the nitrogen removal efficiency was less than 50% though the nitrogen removal performance was obtained. In addition, "B NH4" and "C NH4" mean that ammonium remained in the treated water and the treatment performance decreased, and "B NO2" and "C NO2" mean that nitrite remained in the treated water and the treatment performance decreased.

From FIG. 10, it was found that a preferable range of the volume fraction of the denitrification carrier 24 in the total volume of the nitrification carrier 22 and the denitrification carrier 24 varied depending on the water temperature. Specifically, it was found that the volume fraction of the denitrification carrier 24 was preferably 50 to 75% when the water temperature was 15 to 20° C., was preferably 40 to 65% when the water temperature was 20 to 25° C., and was preferably 20 to 50% when the water temperature was 25 to 37° C.

In particular, under the condition that the water temperature was 25 to 37° C. and the volume fraction of the denitrification carrier 24 was 25 to 40%, a treatment performance of 2.1 kg-N/m$^3$/day, which is extremely high, was obtained, as the rate at which nitrogen disappears from the reactor. This is thought to be because the nitrifying bacteria and the anaerobic ammonium-oxidizing bacteria were retained in high concentration in the nitrification carrier 22 and the denitrification carrier 24, respectively, and the state could be stably maintained in the reactor.

Example 3

A start-up test on a reactor was conducted by using an unacclimated nitrification carrier 22 and an acclimated denitrification carrier 24 in the following procedure.

An activated sludge containing nitrifying bacteria was entrapped and immobilized in a polyethylene glycol-based gel which had been molded into a cube of 3 mm square. The nitrification rate of the entrapping immobilization pellets at this time was 0.5 kg-N/m$^3$-carrier/day or less. In addition, a denitrification carrier which was acclimated under the same conditions as in Example 1 was used for the acclimated denitrification carrier 24.

The above described unacclimated nitrification carrier in an amount of 0.3 L and the acclimated denitrification carrier in an amount of 0.2 L were fed into the reactor (having a volumetric capacity of 2 L) which was used in Example 1. The nitrification carrier was acclimated by making ammonium wastewater having the water quality shown in FIG. 7 flow into this reactor. In the above operation, the water temperature in the reactor was adjusted to 30° C., and also sodium bicarbonate and hydrochloric acid were appropriately added dropwise so that the pH was 7.5.

As a result, it was confirmed that the nitrogen in an amount of 80% or more in the reactor was treated 1 month after the start of the acclimation, and a nitrification reaction with the nitrification carrier and a denitrification reaction with the denitrification carrier were concurrently allowed to proceed in the reactor.

It was confirmed from the result that the nitrification carrier could be acclimated without deactivating the anaerobic ammonium-oxidizing bacteria in the denitrification carrier when the inside of the treatment tank was maintained in an aerobic condition after the unacclimated nitrification carrier and the acclimated denitrification carrier were fed into the treatment tank.

As a Comparative Example, the acclimated nitrification carrier and the unacclimated denitrification carrier were fed into a treatment tank, and then the denitrification carrier was acclimated while the treatment tank was maintained in an aerobic condition. However, the ammonium in the raw wastewater was only oxidized to nitrite even 5 months after the start of the acclimation, and the denitrification reaction could not be confirmed.

Example 4

Figure 11:
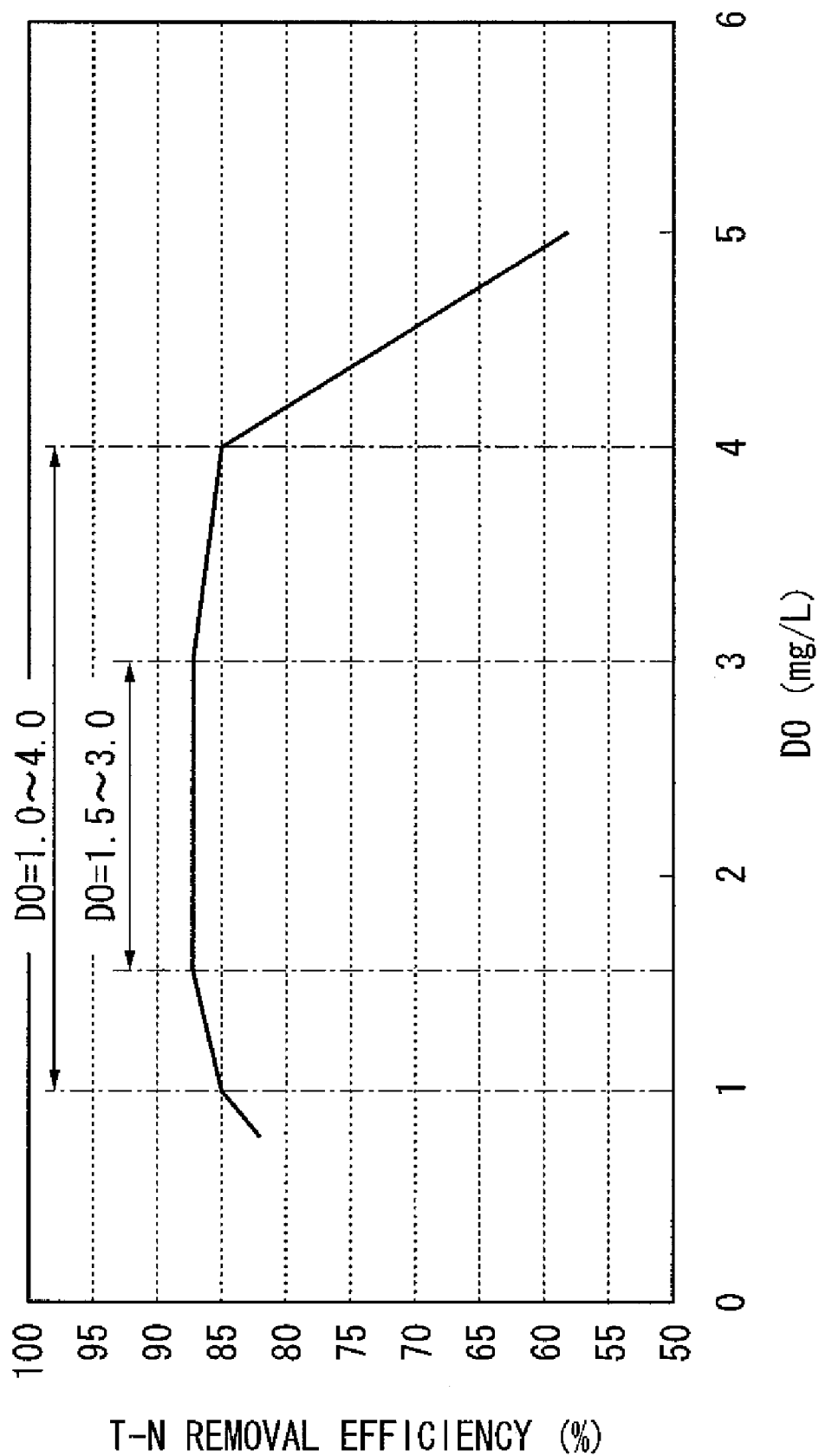
FIG. 11 is a graph showing the relation between the amount of dissolved oxygen and nitrogen removal efficiency in Example 4.

In the nitrification denitrification test in Example 1, the amount of dissolved oxygen and nitrogen removal efficiency in the treatment tank were examined. The result is shown in FIG. 11. It was found from FIG. 11 that when the amount of dissolved oxygen (DO) was at 1 to 4 mg/L, high nitrogen removal efficiency was obtained. In particular, when the amount of dissolved oxygen was at 1.5 to 3.0 mg/L, a very high nitrogen removal efficiency was obtained.

On the other hand, when the amount of dissolved oxygen was less than 1 mg/L, the activity of the nitrifying bacteria which are aerobic bacteria decreased, and the nitrification reaction became a rate-limiting factor. Therefore, the ammonium remained in the treated water, and the nitrogen removal efficiency decreased. In addition, when the amount of dissolved oxygen exceeded 4 mg/L, the activity of the anaerobic ammonium-oxidizing bacteria decreased, and the denitrification reaction became a rate-limiting factor. Therefore, the nitrite remained in the treated water, and the nitrogen removal efficiency decreased.

Example 5

A nitrification carrier 22 and a denitrification carrier 24 were acclimated in a treatment tank 20 by using the wastewater treatment apparatus 60 illustrated in FIG. 3, in the following procedure, and then the wastewater treatment experiment was conducted.

A separating plate 62 was attached to the treatment tank 20 which included a rectangular reactor so that the volumetric capacities of the first acclimation chamber 20A and the second acclimation chamber 20B were each 10 L. Then, the unacclimated nitrification carrier (the same carrier as in Example 1) in an amount of 2 L, and the unacclimated denitrification carrier (the same carrier as in Example 1) in an amount of 1 L were fed into the first acclimation chamber 20A and the second acclimation chamber 20B, respectively.

The ammonium wastewater having the water quality shown in FIG. 7 was made to flow into the treatment tank 20, and the nitrification carrier and the denitrification carrier were acclimated. When the nitrifying carrier and the denitrification carrier were acclimated, the amount of dissolved oxygen in the first acclimation chamber 20A was maintained at 2 to 4 mg/L, and also a 5% solution of sodium bicarbonate (sodium hydrogen carbonate solution) was appropriately added to the wastewater so that the wastewater in the first acclimation chamber 20A were maintained at a pH of 7.5. In addition, an HCl solution (0.2N) was appropriately added to the wastewater so that the wastewater in the second acclimation chamber 20B was maintained at a pH of 7.5. The nitrifying carrier and the denitrification carrier were acclimated in a thermostatic chamber which was maintained at 30° C.

Specifically, the nitrification carrier and the denitrification carrier were acclimated in the following method.

Firstly, the acclimation in the first acclimation chamber 20A was started. Specifically, the nitrification carrier was acclimated in the first acclimation chamber 20A. Next, after the nitrification activity in the first acclimation chamber 20A was confirmed, the treated water in the first acclimation chamber 20A was made to flow into the second acclimation chamber 20B. The inflow rate of the treated water into the second acclimation chamber 20B was increased along with the increase in the activity of the anaerobic ammonium-oxidizing bacteria, and the acclimation was gradually started.

Thereby, 6 months after the start of the acclimation, the nitrification rate was confirmed to be 1.2 kg-N/m$^3$/day in the first acclimation chamber 20A, and the treatment rate was confirmed to be 3.8 kg-N/m$^3$/day in the second acclimation chamber 20B.

After 10 months after the start of the acclimation, the separating plate 62 was detached, and the first acclimation chamber 20A and the second acclimation chamber 20B were connected. Simultaneously, stirring in the second acclimation chamber 20B by a stirrer was stopped, and stirring by aeration was started.

After this, the wastewater treatment operation was continued for 2 months. FIG. 12 is a table showing the average value of water qualities over 2 months during which the wastewater treatment was operated. As is shown in FIG. 12, ammonium nitrogen was almost completely removed. In addition, a stable treatment performance was obtained though the nitrification rate due to nitrifying bacteria was not particularly controlled.

As a Comparative Example, a wastewater treatment was performed after acclimation, in a state in which the separating plate 62 was not removed and the first acclimation chamber 20A (nitrification tank) and the second acclimation chamber 20B (denitrification tank) were consequently separated from each other. In this case, as is shown in FIG. 12, there was a tendency for much ammonium to remain in the treated water. This is thought to be because the nitrification rate in the first acclimation chamber 20A (nitrification tank) was difficult to control to 57% (target value derived from the stoichiometric ratio of the denitrification reaction formula), and the balance between the ammonium and the nitrite which flow into the second acclimation chamber 20B (denitrification tank) was disrupted.

However, as is illustrated in FIG. 12, it was confirmed that the nitrate was formed in the presently disclosed subject matter and the Examples, and the amount of nitrate formed in the Example was slightly larger than that in the Comparative Example. The nitrate was formed in the denitrification reaction with the anaerobic ammonium-oxidizing bacteria. Accordingly, it was found from FIG. 12 that the denitrification reaction with the anaerobic ammonium-oxidizing bacteria was allowed to proceed more in the Example than in the Comparative Example.

In addition, although, according to the embodiment, the unacclimated nitrification carrier and the unacclimated denitrification carrier were fed into the treatment tank 20 without the use of the separating plate 62, and were acclimated under an aerobic condition, the ammonium in the raw wastewater was only oxidized to nitrite, and the denitrification reaction was not confirmed even after 5 months elapsed.

What is claimed is:

1. A method for treating wastewater containing ammonium nitrogen, comprising the steps of:
    preparing a treatment tank in which nitrification carrier having made nitrifying bacteria dominant therein and a denitrification carrier having made anaerobic ammonium-oxidizing bacteria dominant therein are mixed;
    oxidizing, in the treatment tank, the ammonium nitrogen contained in the wastewater to nitrite with the nitrifying bacteria in a nitrification carrier; and
    denitrifying the nitrite formed through the oxidation of the ammonium nitrogen with the anaerobic ammonium-oxidizing bacteria in the denitrification carrier in the treatment tank, while using the ammonium nitrogen in the wastewater as a hydrogen donor.

2. The wastewater treatment method according to claim 1, further comprising the steps of:
    feeding the denitrification carrier into the treatment tank;
    feeding an unacclimated carrier containing the nitrifying bacteria into the treatment tank into which the denitrification carrier has been fed; and
    acclimating the nitrifying bacteria contained in the a carrier in the treatment tank to obtain the denitrification carrier.

3. The wastewater treatment method according to claim 1, further comprising the steps of:
    attaching a separating plate in the treatment tank to separate the treatment tank into a first acclimation chamber and a second acclimation chamber;
    feeding a first carrier containing the nitrifying bacteria to the first acclimation chamber;
    feeding a second carrier containing the anaerobic ammonium-oxidizing bacteria to the second acclimation chamber;
    acclimating the nitrifying bacteria contained in the first carrier in the first acclimation chamber to obtain the nitrification carrier;
    acclimating the anaerobic ammonium-oxidizing bacteria contained in the second carrier in the second acclimation chamber to obtain the denitrification carrier; and
    detaching the separating plate after having acclimated the nitrifying bacteria and the anaerobic ammonium-oxidizing bacteria.

4. The wastewater treatment method according to claim 1, wherein at least one of the nitrification carrier and the denitrification carrier is entrapping immobilization pellets.

5. The wastewater treatment method according to claim 1, further comprising
    maintaining the concentration of dissolved oxygen in the treatment tank at 1 mg/L or more and 4 mg/L or less, in the step of oxidizing the ammonium nitrogen to the nitrite and the step of denitrifying the nitrite.

6. The wastewater treatment method according to claim 1, wherein a rate of the nitrification reaction which oxidizes the ammonium nitrogen to the nitrite is preferably 1.1 kg-N·m$^{-3}$·day$^{-1}$ or more, and
    a rate of the denitrification reaction which denitrifies the nitrite is 2.0 kg-N·m$^{-3}$·day$^{-1}$ or more.

7. A wastewater treatment apparatus comprising
    a treatment tank in which a nitrification carrier having made nitrifying bacteria dominant therein and a denitrification carrier having made anaerobic ammonium-oxidizing bacteria dominant therein are mixed.

8. The wastewater treatment apparatus according to claim 7, further comprising
    a separating plate which is removably attached to the treatment tank to separate the treatment tank into a first acclimation chamber for acclimating the nitrification carrier therein and a second acclimation chamber for acclimating the denitrification carrier therein.

9. The wastewater treatment apparatus according to claim 7, further comprising:
    a baffle plate which is arranged so as to separate the treatment tank into the first treatment chamber and the second treatment chamber, and so as to form a communicating path which allows the first treatment chamber and the second treatment chamber to communicate in the upper part and the bottom part of the treatment tank; and
    a first air-diffusing unit which aerates and stirs the wastewater, and is provided in one of the first treatment chamber and the second treatment chamber so as to form a swirling flow of the wastewater in the treatment tank through the communicating path.

10. The wastewater treatment apparatus according to claim 7, wherein at least one of the nitrification carrier and the denitrification carrier is entrapping immobilization pellets.

11. The wastewater treatment apparatus according to claim 7, further comprising:
    a second air-diffusing unit which aerates and stirs the wastewater in the treatment tank; and
    a control unit which controls the second air-diffusing unit so that the amount of dissolved oxygen in the treatment tank is 1 mg/L or more and 4 mg/L or less.

12. The wastewater treatment apparatus according to claim 9, further comprising
    the first air-diffusing unit is controlled so that the amount of dissolved oxygen in the treatment tank is 1 mg/L or more and 4 mg/L or less.

* * * * *